(12) United States Patent
Janssen

(10) Patent No.: US 9,323,069 B2
(45) Date of Patent: Apr. 26, 2016

(54) BEAM COMBINER AND A COMBINER DEPOLARIZER

(71) Applicant: II-VI Incorporated, Saxonburg, PA (US)

(72) Inventor: Adrian Perrin Janssen, Exeter (GB)

(73) Assignee: II-VI INCORPORATED, Saxonburg, PA (US)

( * ) Notice: Subject to any disclaimer, the term of this patent is extended or adjusted under 35 U.S.C. 154(b) by 0 days.

(21) Appl. No.: 14/422,039

(22) PCT Filed: Aug. 19, 2013

(86) PCT No.: PCT/GB2013/052189
§ 371 (c)(1),
(2) Date: Feb. 17, 2015

(87) PCT Pub. No.: WO2014/029981
PCT Pub. Date: Feb. 27, 2014

(65) Prior Publication Data
US 2015/0219917 A1 Aug. 6, 2015

(30) Foreign Application Priority Data
Aug. 20, 2012 (GB) .................................. 1214830.0

(51) Int. Cl.
*G02B 27/28* (2006.01)
*H01S 3/094* (2006.01)
*G02B 6/27* (2006.01)

(52) U.S. Cl.
CPC ............ *G02B 27/283* (2013.01); *G02B 6/2773* (2013.01); *H01S 3/094073* (2013.01)

(58) Field of Classification Search
CPC ................. G02B 27/283; G02B 6/2773; H01S 3/094073

USPC ............... 359/489.09, 489.1, 489.15, 494.01, 359/639, 640, 831, 837; 385/11, 24, 34, 36, 385/52, 122
See application file for complete search history.

(56) References Cited

U.S. PATENT DOCUMENTS

| 5,440,424 A * | 8/1995 | Wu ....................... G02B 27/283 359/485.06 |
| 6,621,533 B2 * | 9/2003 | Slack ................... G02B 5/3083 348/E9.027 |

(Continued)

FOREIGN PATENT DOCUMENTS

| EP | 0 474 237 A1 | 3/1992 |
| EP | 1 418 653 A1 | 5/2004 |

(Continued)

OTHER PUBLICATIONS

Intellectual Property Office of the United Kingdom, Patents Act 1977: Search Report under Section 17 (5), United Kingdom Patent Application No. GB1214830.0, Dec. 24, 2012, 4 Pages.

(Continued)

*Primary Examiner* — Frank Font
(74) *Attorney, Agent, or Firm* — Fenwick & West LLP

(57) ABSTRACT

The invention relates to a beam combiner for a Raman pump unit. The beam combiner is configured to receive and propagate at least two orthogonally polarized collimated light beams. The beam combiner comprises a birefringent prism and an optically isotropic prism. Each of the prisms is located in the path of the beams and configured so that the beams are substantially parallel to each other when they emanate from the beam combiner.

21 Claims, 6 Drawing Sheets

(56) References Cited

U.S. PATENT DOCUMENTS

| | | |
|---|---|---|
| 6,831,778 B2 | 12/2004 | Yang et al. |
| 2002/0093718 A1* | 7/2002 | Slack ................... G02B 5/3083 |
| | | 359/246 |
| 2002/0109918 A1 | 8/2002 | Wu et al. |
| 2003/0133180 A1* | 7/2003 | Yang ................. H01S 3/094003 |
| | | 359/341.3 |
| 2004/0184148 A1 | 9/2004 | Chang et al. |
| 2004/0240767 A1 | 12/2004 | Kimura et al. |
| 2005/0068631 A1 | 3/2005 | Liu et al. |
| 2005/0243417 A1* | 11/2005 | Massenot ............. G02B 5/3008 |
| | | 359/465 |
| 2012/0194824 A1* | 8/2012 | de Groot ............ G01B 9/02003 |
| | | 356/482 |

FOREIGN PATENT DOCUMENTS

| | | |
|---|---|---|
| GB | 2 135 475 A | 8/1984 |
| JP | 2004-22679 A | 1/2004 |

OTHER PUBLICATIONS

Patent Cooperation Treaty, International Search Report and Written Opinion, PCT/GB2013/052189, Nov. 6, 2013, 9 Pages.

* cited by examiner

BEAM COMBINER AND A COMBINER DEPOLARIZER

TECHNICAL FIELD

The invention relates to a beam combiner for a Raman pump unit. The invention also relates to a combiner depolarizer for a Raman pump unit.

BACKGROUND

In this specification the term "light" will be used in the sense that it is used in optical systems to mean not just visible light, but also electromagnetic radiation having a wavelength outside that of the visible range.

Distributed Raman amplification is used in optical networks for the amplification of optical signals. A Raman pump laser (source) provides a high power pump beam, which is injected into an optical fibre carrying the optical signal to be amplified. This generates stimulated Raman scattering, thereby amplifying the signal.

Typically, at least two Raman pump sources are used and the light from these must be combined. Further, the light from the Raman pump sources is depolarized before injection into the optical fibre to reduce any polarization dependent gain.

Current Raman pump units therefore comprise a combiner, to combine Raman pump beams, and a depolarizer, to depolarize the light in the pump beams. Various configurations are known.

SUMMARY

According to the invention in a first aspect, there is provided a beam combiner for a Raman pump unit. The beam combiner is configured to receive and propagate at least two orthogonally polarized collimated light beams. The beam combiner comprises a birefringent prism and an optically isotropic prism. Each prism is located in the path of the beams and is configured so that the beams are substantially parallel to each other when they emanate from the beam combiner.

Optionally, the birefringent prism and the optically isotropic prism are configured so that the beams are aligned when they emanate from the beam combiner.

Optionally, the birefringent prism is configured to alter the relative angle between the beams such that they are substantially parallel when they emanate from the birefringent prism.

Optionally, the isotropic prism is configured to decrease the spatial separation between the beams such that they substantially overlap in cross section when they emanate from the isotropic prism.

Optionally, the isotropic prism is configured to maintain the relative angle between the beams.

Optionally, the birefringent prism is configured to refract at least one of the beams by spatial walk-off.

Optionally, an optical axis of the birefringent prism is angled with respect to the direction of propagation of the at least one beam as it enters the birefringent prism.

Optionally, a face of the isotropic prism is angled to refract the input beams.

Optionally, the birefringent prism abuts the isotropic prism.

Optionally, the birefringent and isotropic prisms are cemented together.

Optionally, the birefringent prism is spaced apart from the isotropic prism.

Optionally, an air gap between the birefringent prism and the isotropic prism is 1 mm or less.

Optionally, the beams output from the beam combiner are substantially co-axially aligned to each other.

According to the invention in a second aspect, there is provided a combiner depolarizer. The combiner depolarizer comprises a beam combiner as described above. The combiner depolarizer further comprises a depolarizing birefringent prism, optically downstream of the beam combiner. The optical path length of the depolarizing birefringent prism varies across a diameter of each of the beams emanated from the beam combiner.

Optionally, the optical axis of the depolarizing birefringent prism is substantially perpendicular to the optical axis of the birefringent prism of the beam combiner.

Optionally, the depolarizing birefringent prism abuts the beam combiner.

Optionally, the depolarizing birefringent prism is spaced apart from the beam combiner.

According to the invention in a second aspect, there is provided an optical assembly comprising a beam combiner as described above or a beam combiner depolarizer as described above. The optical assembly further comprises an input gradient index microlens optically upstream of the beam combiner and for collimating the input beams.

Optionally, the beam combiner abuts the input gradient index microlens.

Optionally, the beam combiner is cemented to the input gradient index microlens.

Optionally, the isotropic prism is optically upstream from the birefringent prism and is integrated into the input gradient index microlens.

Optionally, the optical assembly further comprises an output gradient index microlens optically downstream of the beam combiner and configured to focus the beams emanating from the beam combiner to the same focus point.

BRIEF DESCRIPTION OF THE FIGURES

Exemplary embodiments of the invention will now be described with reference to the accompanying drawings, in which.

SPECIFIC DESCRIPTION

Figure 1:
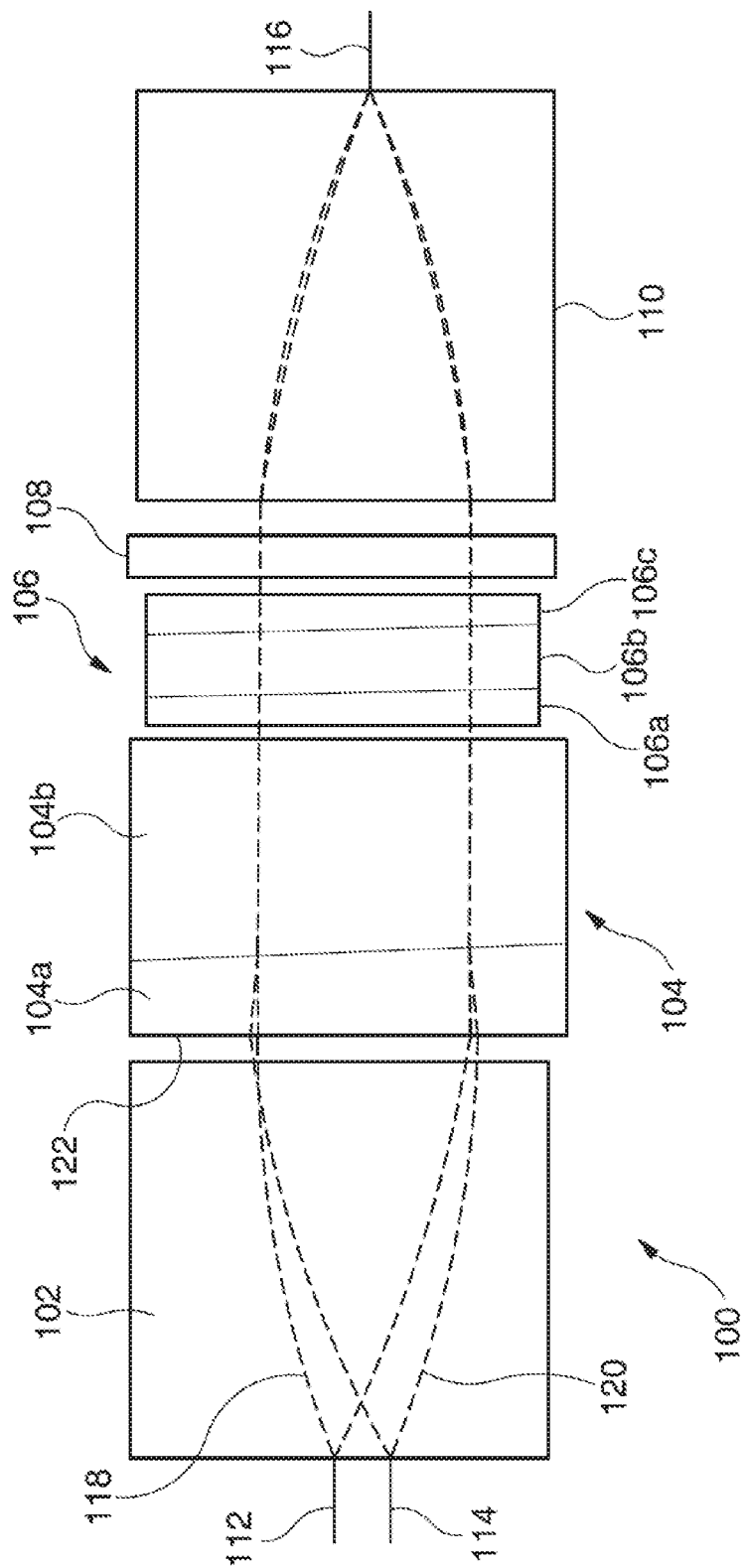
FIG. 1 is a section through an optical assembly comprising a beam combiner.

FIG. 1 shows an optical assembly 100 for use in a Raman pump unit. The optical assembly 100 comprises an input gradient index microlens 102, a beam combiner 104, a polarization independent isolator 106, a quarter wave plate depolarizer 108 and an output gradient index microlens 110.

Light beams are Raman pump light beams input to the input gradient index microlens 102 via polarization maintaining (PM) fibres 112, 114. The light beams travel through the optical assembly 100 to be output from the output gradient index microlens 110 into an output polarization maintaining fibre 116. Therefore, an optical flowpath can be defined from the input gradient index microlens 102, through to the output gradient index microlens 110. In view of this, the features of the optical assembly 100 may be considered to be optically upstream or optically downstream of one another, wherein optically downstream is in the direction of the optical flowpath and optically upstream is opposite the direction of the optical flowpath. For example, the beam combiner 104 may be considered to be optically downstream of the input gradient index microlens 102.

The beam combiner 104 comprises an optically isotropic prism 104a and a birefringent prism 104b optically downstream of the isotropic prism 104a. The isotropic prism 104a comprises an optically isotropic material, and the birefringent prism 104b comprises birefringent material. The prisms 104a, 104b are configured to output from the beam combiner 104 orthogonally polarized collimated beams that are parallel to each other and are optionally aligned.

The birefringent material in this example is Yttrium Vanadate. The optically isotropic material may be BK7 or N-SF66 high index glass. Other birefringent or optically isotropic materials may be used.

The term prism as used herein does not necessarily refer to a geometric prism. The term prism encompasses an optical prism, which may be defined as a transparent element with flat surfaces at which light may be refracted. Prisms as disclosed herein may be geometric prisms, but they are not limited to such.

Two Raman pump sources (not shown) output high power pump light into PM optical fibres 112, 114. The PM fibres 112, 114 input the pump light to the input gradient index microlens 102 of the optical assembly 100 as two light beams 118, 120. The beam 118 is orthogonally polarized with respect to the beam 120.

The input gradient index microlens 102 collimates the beams 118, 120. The input gradient index microlens 102 is manufactured as a gradient index microlens. The beams 118, 120 are initially divergent and are collimated as they propagate through the input gradient index microlens 102. The output from the input gradient index microlens 102 is two broad collimated beams 118, 120. The two beams 118, 120 are collimated and are substantially the same width as each other. However, the beams 118, 120 are angularly displaced with respect to each other. That is, they are each propagating in different directions.

The beam combiner 104 is optically downstream of the input gradient index microlens 102 and is configured to receive and propagate the collimated light beams 118, 120. The beam combiner 104 redirects the beams 118, 120 such that they are parallel to each other on emerging from the prism combination 104.

The beams 118, 120 are input to the optically isotropic prism 104a, which refracts the beams 118, 120 such that, when they are output from the birefringent prism 104b, the directions of the beams 118, 120 are identical and are nominally along the central axis of the optical device, so that the input and output lenses 102, 110 are parallel. That is, when the beams 118, 120 are output from the optically isotropic prism, they are substantially overlapping in cross section. The direction of the beams 118, 120 relative to each other should remain substantially unchanged after propagation through the optically isotropic prism 104a. Therefore, when the beams are output from the optically isotropic prism 104a they are propagating in different directions and are substantially overlapping.

To achieve a decrease in the spatial separation of the beams 118, 120, the optically isotropic prism 104a has an output face that is angled with respect to the direction of the optical flowpath. In alternative beam combiners, input face (122) may be angled with respect to the optical flowpath.

The beams 118, 120 are output from the optically isotropic prism 104a and input to the birefringent prism 104b. The polarization direction of the beam 118 is perpendicular to (i.e. is in the extraordinary direction with respect to) the optical axis of the birefringent prism 104b. Therefore, the beam 118 experiences spatial walk-off as it is propagated through the birefringent prism 104b. As a result, the direction of the beam 118 is altered through the birefringent prism 104b. The birefringent prism 104b is configured to alter the path of the beam 118 such that both beams 118, 120 emerge from the birefringent prism 104b substantially parallel.

The amount of spatial walk-off, and therefore the amount of deviation of the beam 118, is determined by the refractive index of the birefringent material in the extraordinary direction and the angle of the optical axis of the birefringent prism 104b with respect to the direction of propagation of the beam 118 through the birefringent prism 104b. This angle is calculated using the two conditions: i) that the emerging beam is parallel to the central axis of the first lens; and ii) that the incident angle of each beam having a given polarization is such that the birefringence index for each produces refraction to give parallel output beams.

In an exemplary optical assembly, the optical axis for the birefringent prism 104b is directed along an X-axis, perpendicular to the propagation direction of the beam 118 and perpendicular to the paper plane of FIG. 1, and is at an angle of 68.3 degrees to a Z-axis, the direction of beam propagation. The isotropic prism 104a has a refractive index close to that of birefringent prism 104b and may comprise, for example, LASF35 glass (refractive index~2.0). This provides a solution with a common prism angle of 21.66 degrees which allows the beams to emerge un-deviated from the input beam direction.

In the exemplary beam combiner 104 of FIG. 1, the optical axis of the birefringent prism 104b is aligned in an X-axis.

The walk off angle may be calculated using the formula:

$$\rho = -\frac{1}{n_e}\frac{\partial n_e}{\partial \theta}$$

where $\rho$ is the spatial walk-off angle or angle of deviation of the beam 118, $n_e$ is the refractive index of the birefringent material in the extraordinary direction and $\theta$ is the angle of propagation of the beam from the optical axis of the birefringent material.

Therefore, the beams 118, 120 are each output from the beam combiner 104 substantially parallel to each other. Preferably, the beams 118, 120 are output from the beam combiner 104 co-axially aligned. However, co-axial alignment is not always necessary as the beams 118, 120 are focussed to the same point by the output gradient index microlens. The direction of each beam 118, 120 output from the beam combiner 104 is preferably substantially un-deviated from the direction of each beam 118, 120 input to the input gradient index microlens 102.

The alignment of the beams 118, 120 may be achieved due to the decrease in their spatial separation provided by the optically isotropic prism 104a. The beams 118, 120 are made parallel to each other because of the spatial walk-off imparted to at least one of the beams 118, 120 while propagating through the birefringent material of the birefringent prism 104b.

The optically isotropic prism 104a may work in conjunction with the birefringent prism 104b. That is, the birefringent prism 104b may refract one or more of the beams 118, 120 and this refraction, should be accounted for in the design of the optically isotropic prism 104a to ensure that the beams 118, 120 output from the beam combiner 104 are substantially parallel and preferably substantially co-axially aligned.

After being output from the beam combiner 104, the beams 118, 120 are input to the polarization independent isolator 106. The polarization independent isolator 106 comprises an input birefringent wedge 106a, a Faraday rotator 106b, and an output birefringent wedge 106c. The isolator 106 prevents any optical feedback entering the laser cavities of the Raman pump sources.

The beams 118, 120 are then transmitted further downstream to the quarter wave plate depolarizer 108, which comprises a birefringent material. The orthogonally polarized beams 118, 120 comprise a number of different modes of light, which are propagated through the quarter wave plate 108 at different speeds and so are output having different polarization states. Other types of depolarizer may be used.

After depolarization, the beams 118, 120 are output from the quarter wave plate 108 and input to the output gradient index microlens 110, which focuses the beams 118, 120 such that they are combined into an output PM fibre 116.

The focus point of the beams 118, 120 can be altered by changing the orientation of the birefringent prism 104b in the X-axis. Changing the orientation of the birefringent prism 104b changes the angle of the optical axis of the prism 104b with respect to the direction of propagation of the beams 118, 120 through the prism 104b. This in turn changes the amount of spatial walk-off of the beam 118, thereby altering the focus point of the beams 118, 120. In tests, a rotation of approximately 1 degree about the Y-axis alters the focus separation by approximately 0.7 μm.

In alternative beam combiners, the first prism may be the birefringent prism and the second prism may be the optically isotropic prism.

In other alternative beam combiners, each of the beams 118, 120 may be polarized transverse to the optical axis of the birefringent prism 104b. That is, the polarization of each of the beams 118, 120 may be angled with respect to the optical axis of the birefringent prism 104b. As a result, each of the beams 118, 120 may experience an amount of spatial walk-off.

The dimensions of the isotropic and birefringent prisms 104a, 104b may be determined pragmatically by optimising the beams using an optical system modeller, which is embodied in software, e.g. Zemax, and shows how beams propagate through lenses and other optical components.

FIGS. 2 to 5 show various implementations of a beam combiner.

Figure 2:
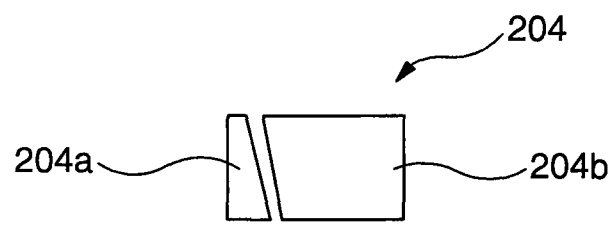
FIG. 2 shows an implementation of a beam combiner.

Referring to FIG. 2, a beam combiner 204 comprises an optically isotropic prism 204a and a birefringent prism 204b spaced apart. An angled face of the optically isotropic prism 204a is parallel to a face of the birefringent prism 204b. If there is an air gap between the angled face of the isotropic prism 204a and the face of the birefringent prism 204b, this should be accounted for in the optical design of the beam combiner. Also the air interfaces should have an anti-reflective (AR) coating.

In exemplary optical assemblies, the birefringent prism is separated from the isotropic prism by an air gap of 1 mm or less.

Figure 3:
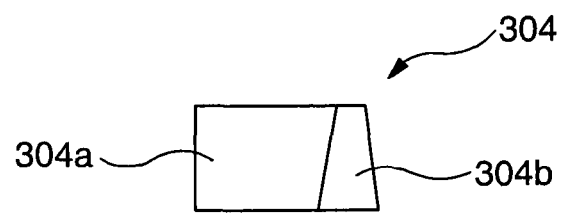
FIG. 3 shows an implementation of a beam combiner.

Referring to FIG. 3, a beam combiner 304 comprises an optically isotropic prism 304a and a birefringent prism 304b abutted thereto. The optically isotropic prism 304a and the birefringent prism 304b may be cemented together using a cement suitable for optical systems. The thicknesses of the prisms 304a, 304b are different in FIG. 3 to FIG. 2. In FIG. 3, the isotropic prism 304a is thicker than the birefringent prism 304b. This exemplary beam combiner 304 is a step towards a completely cemented structure from lens 102 to lens 110. In order to achieve this, the end faces of the lenses 102, 110 should be angled (shown in FIG. 5).

Figure 4:
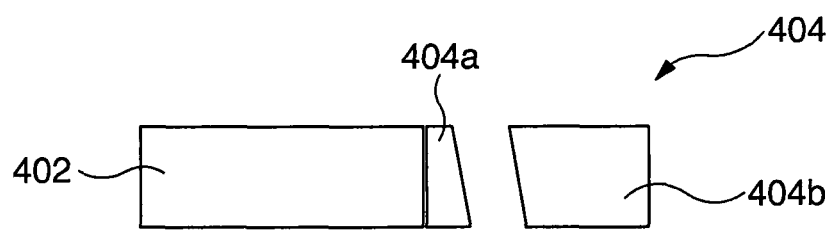
FIG. 4 shows an implementation of a beam combiner.

Referring to FIG. 4, a beam combiner 404 comprises an optically isotropic prism 404a and a birefringent prism 404b spaced apart. The optically isotropic prism 404a abuts an input gradient index microlens 402. The optically isotropic prism 404a may be cemented to the input gradient index microlens 402 using a cement suitable for optical systems.

Figure 5:
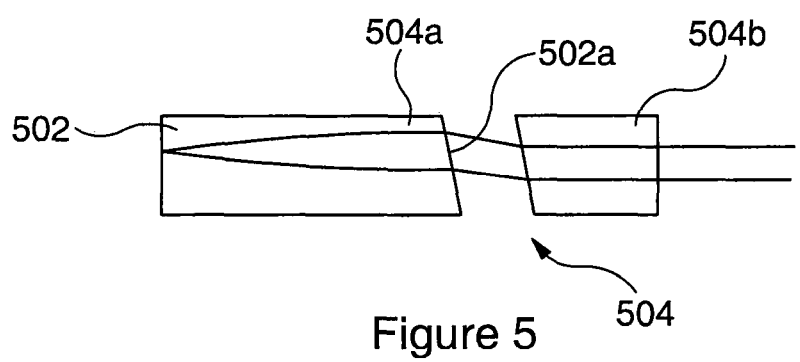
FIG. 5 shows an implementation of a beam combiner.

Referring to FIG. 5, a beam combiner 504 comprises an optically isotropic prism 504a integrated into an input gradient index microlens 402. The output face 502a of the input gradient index microlens 502 is angled.

Figure 6A:
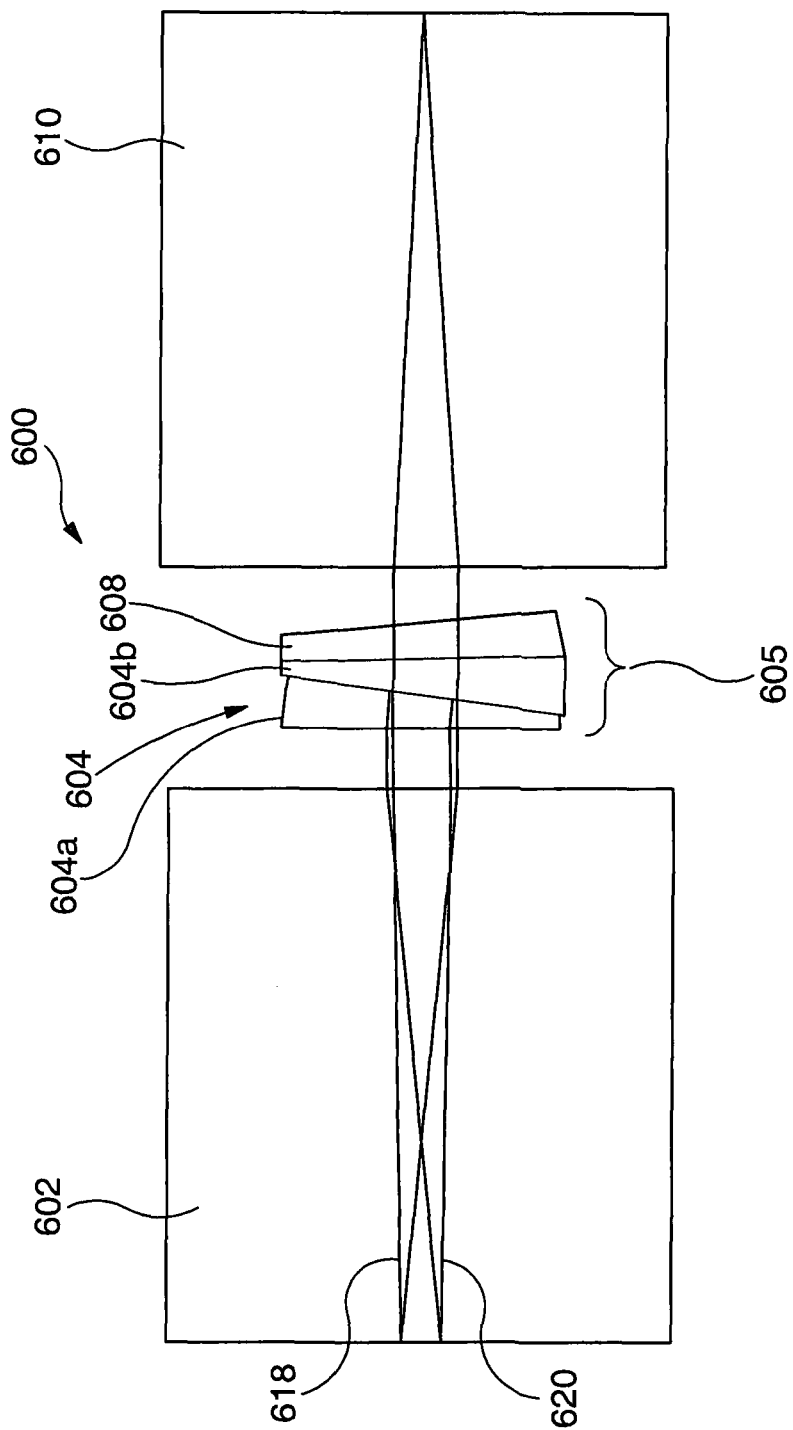
FIG. 6A is a section through an optical assembly comprising a depolarizing combiner.

FIG. 6A shows a section through an optical assembly 600 for a Raman pump unit. For simplicity, some elements of the optical assembly 100 of FIG. 1 have been omitted. The optical assembly 600 of FIG. 6 shows only an input gradient index microlens 602, a beam combiner 604, a depolarizer 608 and an output gradient index microlens 610.

The optical assembly 600 comprises a depolarizer combiner 605, which comprises the beam combiner 604 and a depolarizing birefringent prism 608 optically downstream of the second prism 604b of the beam combiner 604. The beam combiner 604 is as described above and operates in the same way.

The optical axis of the depolarizing birefringent prism 608 is transverse to the optical axis of the beam from the birefringent prism 604b of the beam combiner 604. In exemplary depolarizing-combiners 605 the optical axis of the depolarizing birefringent prism 608 is perpendicular to the optical axis of the birefringent prism 604b of the beam combiner 604.

The depolarizing birefringent prism 608 is shown abutting the second prism 604b of the beam combiner 604. In other exemplary depolarizing combiners 605, the depolarizing birefringent prism 608 may be spaced apart from the second prism 604b of the beam combiner 604.

The optical length, or downstream length, of the depolarizing birefringent prism 608 varies across the width of the combined beams 618, 620. As a result, the beams 618, 620 must travel through different amounts of birefringent material at different points within the beam widths. This has the effect that light at different points across the beam widths is subject to different amounts of retardation as it propagates through the depolarizing birefringent prism 608. Different areas of the beam widths are therefore subject to different polarization states leading to a depolarization of the beams 618, 620. The various modes of light in the beams 618, 620 travel through the depolarizing birefringent prism 608 at different speeds, thereby having a depolarizing effect on the beams 618, 620. The combined effect of the varying optical length of the birefringent depolarizing prism 608 and the birefringent material itself more fully completes a Poincaré Sphere and increases the amount of depolarization of the beams 618, 620.

The depolarizing combiner 605 therefore provides for spatially separated orthogonally polarized Raman pump sources to be combined and depolarized within a single prism package.

The birefringent prism 604b is typically oriented with an optical axis perpendicular to the propagation direction of the beams 618, 620 and rotated to give circular polarization. The birefringent prism 604b has a thickness of several wave orders, which may typically be several hundred microns for a prism comprising Calcite. The internal wedge angle may be of the order of a degree but depends on the thickness variation over an aperture dimension of the depolarizer. This is, in any case, sufficient to give greater than $2\pi$ phase variation between the thickest and thinnest sides of the depolarizer.

Figure 6B:
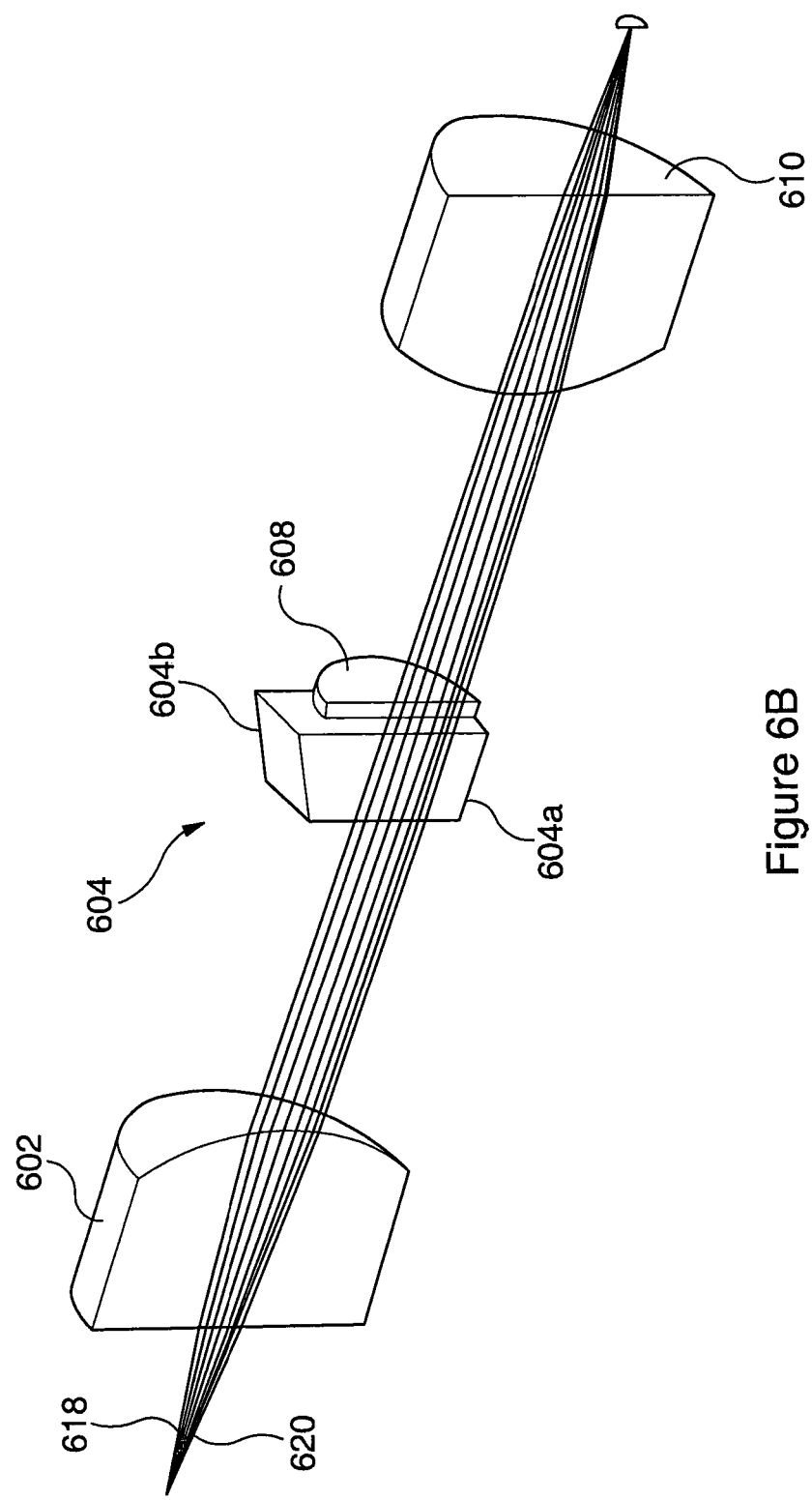
FIG. 6B is a perspective view of a section through an optical assembly comprising a depolarizing combiner.

A perspective view of the optical assembly 600 comprising a depolarizing-birefringent prism 608 is shown in FIG. 6B. In FIG. 6B, the depolarizing birefringent prism 608 is spaced apart from the beam combiner 604.

In the exemplary optical assemblies discussed above and shown in FIGS. 2 to 6B, the optical axis is not coincident with the direction of propagation. The conditions described above give walk-off between polarized beams. If the direction of propagation of the beams is along the optical axis then the differently polarized beams experience the same index and are not separated, i.e. there is no walk-off.

FIGS. 7A, 7B, 8A and 8B show the depolarization achieved by the depolarizing birefringent prism 608.

Figure 7A:
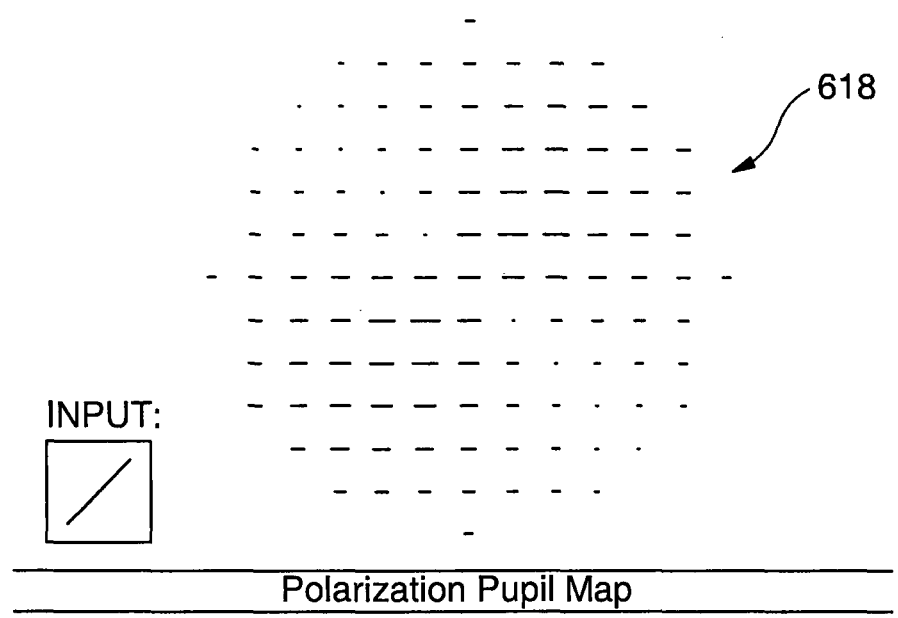
FIG. 7A shows the polarization of a beam before depolarization.
Figure 7B:
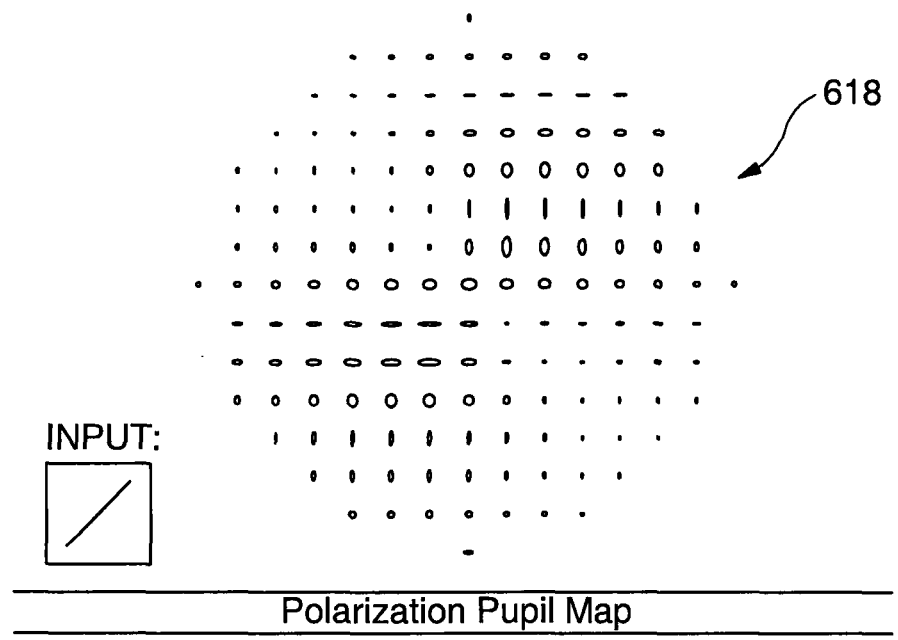
FIG. 7B shows the polarization of a beam after depolarization.

FIG. 7A shows the polarization of beam 618 as it is output from the PM fibre 112. Beam 618 is represented by a series of horizontal lines arranged in a rough circle representing the width of the beam 618. The beam 618 is horizontally linearly polarized and this is represented by the horizontal lines in the figure. The length of each line represents the amount of polarization at that part of the beam 618. FIG. 7B shows the polarization states of the beam 618 after it has passed through the depolarizing birefringent prism 608. As can be seen from FIG. 7B, the polarization states of the beam 618 have changed to a combination of horizontal linear, vertical linear, circular and elliptical polarization. The mixture of polarization states shows that the beam 618 has been substantially depolarized.

Figure 8A:
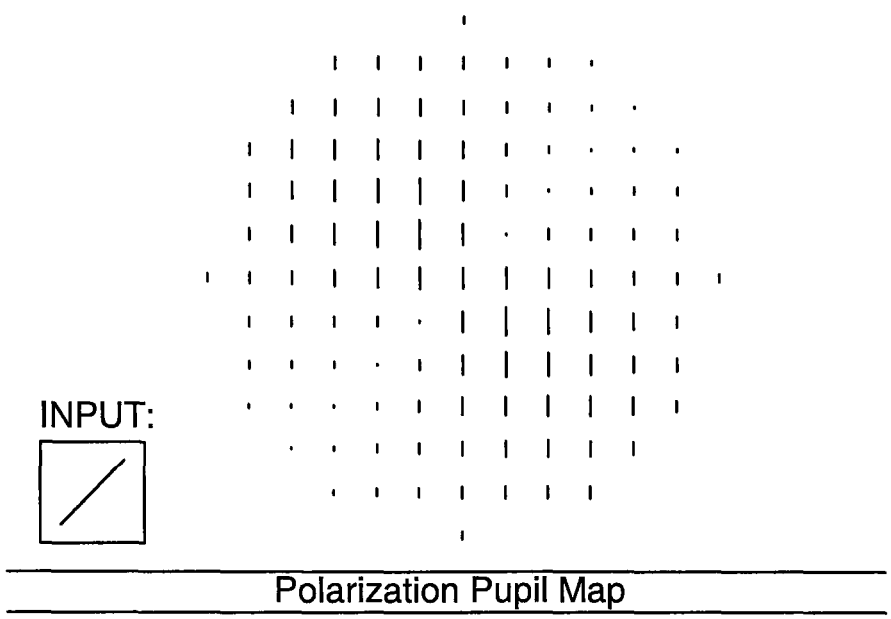
FIG. 8A shows the polarization of a beam before depolarization.
Figure 8B:
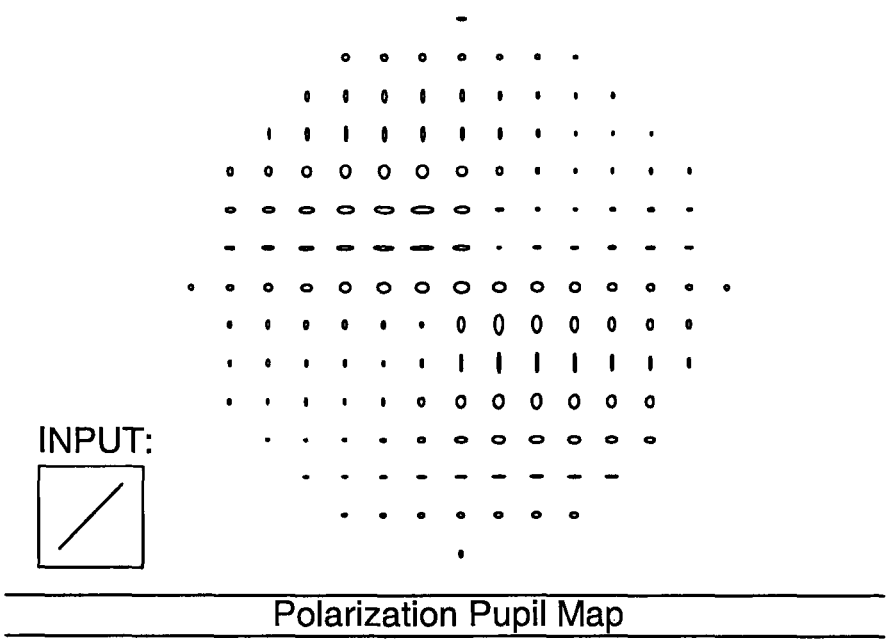
FIG. 8B shows the polarization of a beam after depolarization.

FIGS. 8A and 8B show the equivalent polarization states for beam 620. As can be seen in FIG. 8A, the beam 620 is orthogonally polarized with respect to the beam 618 before polarization. That is the beam 620 is vertically linearly polarized. After passing through the depolarizing birefringent prism 608, the beam 620 is substantially depolarized.

The skilled person will be able to envisage other embodiments of the invention without departing from the scope of the appended claims.

The invention claimed is:

1. A beam combiner depolarizer for a Raman pump unit, the beam combiner depolarizer configured to receive and propagate at least two orthogonally polarized collimated light beams, and comprising:
   a beam combiner comprising a birefringent prism and an optically isotropic prism, each located in the path of the beams and configured so that the beams are substantially parallel to each other when they emanate from the beam combiner; and
   a depolarizing birefringent prism, optically downstream of the beam combiner, wherein, an optical path length of the depolarizing birefringent prism varies across a diameter of each of the beams emanated from the beam combiner.

2. The beam combiner depolarizer according to claim 1, wherein the birefringent prism and the optically isotropic prism are configured so that the beams are aligned when the beams emanate from the beam combiner.

3. The beam combiner depolarizer according to claim 1, wherein the birefringent prism is configured to alter a relative angle between the beams such that the beams are substantially parallel when the beams emanate from the birefringent prism.

4. The beam combiner depolarizer according to claim 1, wherein the isotropic prism is configured to decrease a spatial separation between the beams such that the beams substantially overlap in cross section when the beams emanate from the isotropic prism.

5. The beam combiner depolarizer according to claim 1 claim, wherein the isotropic prism is configured to maintain a relative angle between the beams.

6. The beam combiner depolarizer according to claim 1, wherein the birefringent prism is configured to refract at least one of the beams by spatial walk-off.

7. The beam combiner depolarizer according to claim 6, wherein an optical axis of the birefringent prism is angled with respect to a direction of propagation of the at least one beam as it enters the birefringent prism.

8. The beam combiner depolarizer according to claim 1, wherein a face of the isotropic prism is angled to refract input beams.

9. The beam combiner depolarizer according to claim 1, wherein the birefringent prism abuts the isotropic prism.

10. The beam combiner depolarizer according to claim 9, wherein the birefringent and isotropic prisms are cemented together.

11. The beam combiner depolarizer according to claim 1, wherein the birefringent prism is spaced apart from the isotropic prism.

12. The beam combiner depolarizer according to claim 11, wherein an air gap between the birefringent prism and the isotropic prism is 1 mm or less.

13. The beam combiner depolarizer according to claim 1, wherein beams output from the beam combiner are substantially co-axially aligned to each other.

14. The beam combiner depolarizer according to claim 1, wherein the optical axis of the depolarizing birefringent prism is substantially perpendicular to an optical axis of the birefringent prism of the beam combiner.

15. The beam combiner depolarizer according to claim 1, wherein the depolarizing birefringent prism abuts the beam combiner.

16. The beam combiner depolarizer according to claim 1, wherein the depolarizing birefringent prism is spaced apart from the beam combiner.

17. An optical assembly comprising a beam combiner depolarizer according to claim 1, the optical assembly further comprising an input gradient index microlens optically upstream of the beam combiner and for collimating input beams.

18. The optical assembly according to claim 17, wherein the beam combiner abuts the input gradient index microlens.

19. The optical assembly according to claim 18 wherein the beam combiner is cemented to the input gradient index microlens.

20. The optical assembly according to claim 17, wherein the isotropic prism is optically upstream from the birefringent prism and is integrated into the input gradient index microlens.

21. The optical assembly according to claim 17 further comprising an output gradient index microlens optically downstream of the beam combiner and configured to focus the beams emanating from the beam combiner to a same focus point.

* * * * *